Sept. 15, 1964  A. COHEN  3,148,443
AUTOMATIC STEM AND CROWN ASSEMBLY DEVICE
Filed Dec. 14, 1961
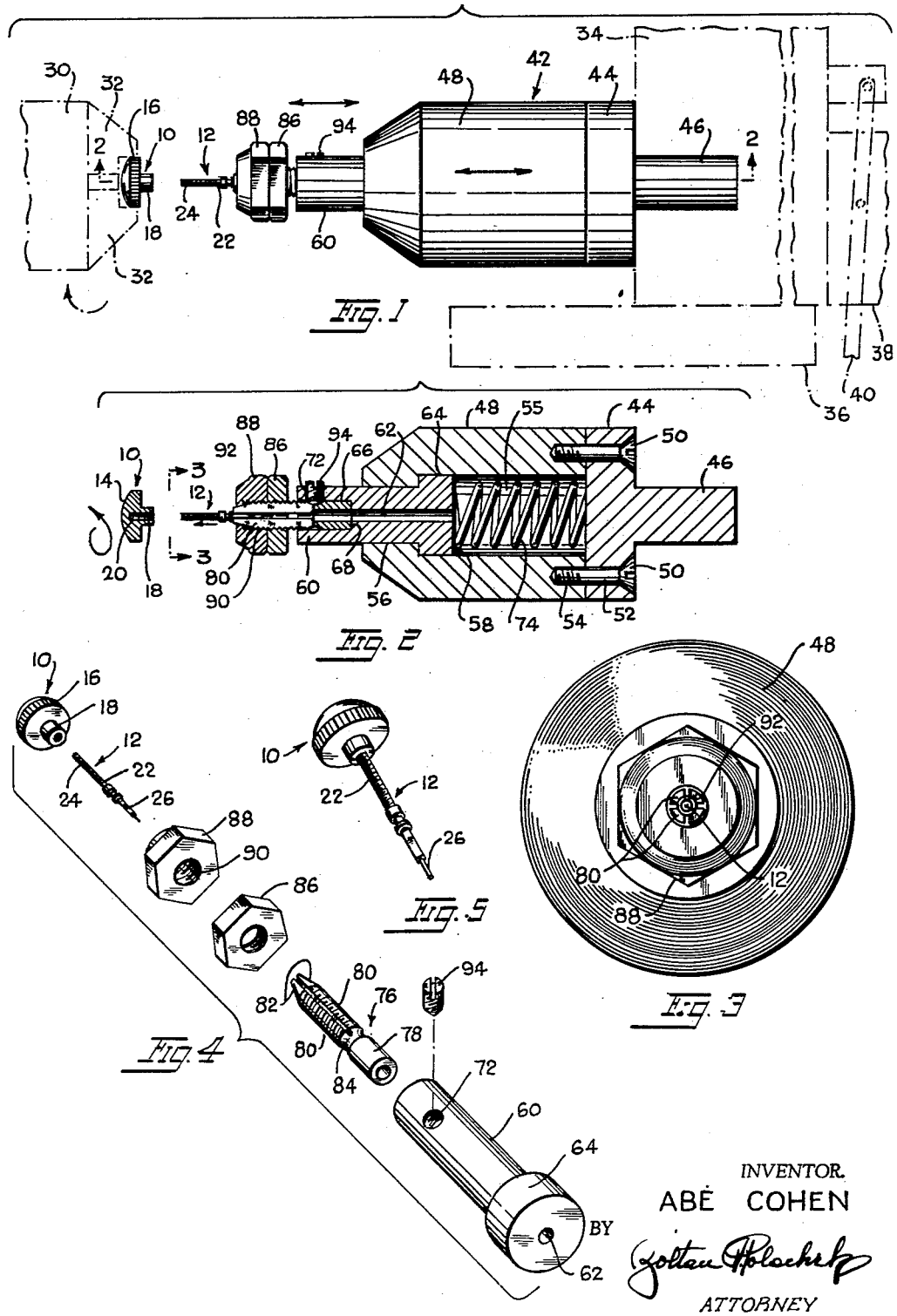
INVENTOR.
ABE COHEN
BY
Zoltan Holocheck
ATTORNEY

United States Patent Office 3,148,443
Patented Sept. 15, 1964

3,148,443
AUTOMATIC STEM AND CROWN
ASSEMBLY DEVICE
Abe Cohen, 1335 Johnson Ave., Bronx, N.Y.
Filed Dec. 14, 1961, Ser. No. 159,386
1 Claim. (Cl. 29—240)

This invention relates generally to the art of watchmaking and more particularly to apparatus for and a method of automatically assembling a round crown head having a central socket and an elongated stem having a threaded end.

The crown and stem assemblies used in watches are ordinarily very small so that difficulty is experienced in assembling the crown and stem and considerable time and labor are consumed in completing such assemblies.

It is therefore a principal object of the present invention to overcome this difficulty by providing apparatus for and a method of assembling a crown head and stem by carrying a threaded steam toward and into a crown head and automatically fastening the same therein.

Another object of the invention is to provide improved chuck mechanism for holding the threaded stem so that it can be slidably carried toward the crown and rotated when it contacts the crown head.

A further object of the invention is to provide apparatus for carrying a threaded stem to and into a socketed crown head, which apparatus is simple in construction, positive in action and highly efficient in operation.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a side elevational view of apparatus embodying the invention, parts of the mandrel and collet structures being shown in dot-dash lines, the stem being shown in position preparatory to insertion into the crown head.

FIG. 2 is a horizontal sectional view taken on the line 2—2 of FIG. 1.

FIG. 3 is a view seen from the line 3—3 of FIG. 2, on an enlarged scale.

FIG. 4 is a spread perspective view of part of the chuck mechanism and crown head and stem.

FIG. 5 is an enlarged perspective view of the completed crown head and stem assembly.

Referring in detail to the drawings, in FIG. 1 a crown head 10 and a stem 12 are shown in aligned position preparatory to being assembled. In FIG. 5, the head 10 and stem 12 are shown completely assembled.

The crown head has a round body 14 with knurled periphery 16 and a central protruding socket portion 18 internally screw threaded as indicated at 20. The stem has an elongated body 22 with one end externally screw threaded as indicated at 24 and the other end pointed as indicated at 26.

The present invention contemplates improved apparatus for carrying the stem 12 to the crown head 10, inserting the threaded end of the stem into the socket portion 18 and fastening the end of the stem in the socket portion. For this purpose, a conventional collet 30 is used and is rotated in the usual manner. The collet is provided with the usual radially movable jaws 32 for clamping the crown head 10 therebetween with its socket portion 18 protruding outwardly thereof. Opposite the collet 30, a conventional mandrel 34 is slidably mounted on a bed 36 and is provided with a slidable tailstock 38 actuated by a lever 40.

In accordance with the invention, improved chuck mechanism is carried by the sliding mandrel 34. This chuck mechanism comprises a cylindrical sectional casing 42 including a solid base section 44 with a central cylindrical protruding stem 46 and a tubular section 48 fastened at one end to the solid base section 44 by screws 50 extending through holes 52 in the base section and into threaded socketed recesses 54 in the end of the tubular section. The diameter of the central opening 55 in the tubular section 48 is reduced in diameter at its open end as indicated at 56 forming an inner shoulder 58. An elongated cylindrical member 60 having a central narrow bore 62 and an external collar 64 at one end is loosely mounted in the restricted portion 56 of the tubular section 48, the collar 64 contacting the shoulder 58. The diameter of the central bore in the cylindrical member 60 at its other end is enlarged as indicated at 66 thereby forming an inner shoulder 68. A radial threaded hole 72 is formed in the outer end of the cylindrical member 60 and communicates with the enlarged portion 66 of the bore thereof. A coiled compression spring 74 is mounted in the central opening 55 in tubular section 48 with one end seated against the base section 44 and its other end impinging against the collared end of the cylindrical member 60. The spring 74 urges the cylindrical member 60 outwardly of the casing 42. A collet or chuck device 76 is removably mounted in the enlarged portion 66 of the central bore of the cylindrical member 60 with one end protruding outwardly thereof. The collet or chuck device has an elongated tubular body 78 with the material of the body slitted from midway its ends to one end thereof forming two opposed radially movable jaws 80, 80, with tapered free ends 82, 82 and externally screw threaded. An annular groove 84 is formed in the outer surface of the body between the jaws 80, 80 and the remainder of the body.

A clamping and locking nut assembly is mounted on the externally threaded protruding end of the collet or clutch 76. This assembly consists of a locking nut 86 threaded on the jaws 80, 80 and seating against the end of the cylindrical member 60 to lock the parts in place. A clamping nut 88 is mounted on the jaws outwardly of the locking nut 86. Nut 88 has a central opening with a straight threaded portion 90 and a smooth slanting portion 92 adapted to engage the slanting ends 82 of the collet 76.

In operation, a crown head 10 is clamped between the jaws 32 of the collet 30 with the socket portion 18 thereof opening outwardly. The collet 30 is rotated in the usual manner. The pointed end 26 of the stem 12 is inserted between the jaws 80, 80 of the collet 76 and clamped therebetween by means of the clamping nut 88 leaving the threaded end 24 thereof protruding outwardly as shown in FIG. 1.

The tailstock 38 is moved toward the collet 30 by means of the lever 40 sliding the mandrel 34, which in turn carries the chuck mechanism with the stem 12 toward the crown head 10 in the collet 30. Upon reaching the socket portion 18 of the crown head, the outermost internal thread or convolution on the socket portion 18 of the spinning crown head meshes with the outermost thread or convolution of the external threads on the slidable stem 12 whereupon the threads in the socket portion spinning over and meshing with the threads on the stem pull the stem inwardly of the socket portion until the end of the stem strikes the bottom of the threaded recess in the socket whereupon the force of the spinning crown head is such that it carries the stem 12 around with it and the stem in turn rotates the collet 76 and cylindrical member 60 as a unit in opposition to the coil spring 74 in the central opening 55 in the casing 48. The loose mounting of the cylindrical member 60 in the casing 48 permits this operation, the force of the spinning crown head 10 being greater than the pressing force of the coil spring 74. The coil spring 74 also serves to prevent the stem and collet and cylindrical member as a unit from moving away from the crown head during this operation. Spring 74 also serves to move the stem 12 into the crown head 10 at the end of the throw of the tailstock.

A setscrew 94 in hole 72 in cylindrical member 60 is provided to adjust the tension of the connection between the cylindrical member 60 and the collet 76. By setting up on the screw its inner end is adapted to seat in the annular groove 84 in collet 74 thereby rigidly tying the collet and cylindrical member to each other whereby the collet and cylindrical member rotate as a unit. By loosening and adjusting the tension of the screw 94, the tension of the connection between the cylindrical member 60 and collet 76 may be reduced so that only the collet 76 with nuts 86 and 88 is turned by the turning stem 12 when the stem 12 is screwed completely into the socket portion of the crown head 10.

When the assembly has been completed, by merely unscrewing the clamping nut 88, the clutching mechanism is released from the stem.

It will be seen that I have provided quick, positive and efficient apparatus for carrying the stem 12 to the crown head 10 and fastening the stem to the crown head. In practice, approximately 3,000 crown head and stem assemblies have been completed by a single person in an eight hour day.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

Apparatus for assembling a crown having a central socket and a stem having a threaded end, said apparatus comprising in combination a rotatable collet having radially movable jaws adapted removably to hold a crown with its socket opening outwardly, and a sliding mandrel, said mandrel having mechanism for slidably, rotatably and removably carrying a stem with its threaded end extending outwardly, said mechanism including a sectional casing having a tubular section and a solid base section, a cylindrical member rotatably mounted in the tubular section, said member having a central bore, the diameter of which is enlarged at one end thereof, said cylindrical member having a radial hole at one end communicating with the enlarged portion of the central bore, a collet in the enlarged portion of the central bore and extending outwardly of the cylindrical member, said collet having radially movable jaws adapted to receive one end of a stem therebetween, a clamping nut on the collet for clamping the jaws against the stem, a setscrew in the radial hole in the cylindrical member contacting the collet in the enlarged portion of the bore in the cylindrical member which may be adjusted for rigidly or nonrigidly connecting the cylindrical member and the collet in the enlarged portion of the bore, and a coiled compression spring in the tubular section of the casing, said spring having one end seated against the solid base section of the casing and its other end impinging against the inner end of the cylindrical member for holding the cylindrical member against longitudinal movement in the tubular section whereby said spring determines the maximum torque transmitted with a rigid connection and the nonrigid connection effects lesser values of torque transmittal, and a lever for sliding the mandrel.

References Cited in the file of this patent
UNITED STATES PATENTS

| | | |
|---|---|---|
| 956,298 | Cudahy | Apr. 26, 1910 |
| 1,337,205 | Dingman | Apr. 20, 1920 |
| 1,765,825 | Cork | June 24, 1930 |
| 2,709,600 | Lehde | May 31, 1955 |